Sept. 20, 1960     M. A. MOSKOVITZ ET AL     2,953,401
BALL-JOINT SUSPENSION MEANS FOR STEERABLE WHEELS
Filed April 5, 1954
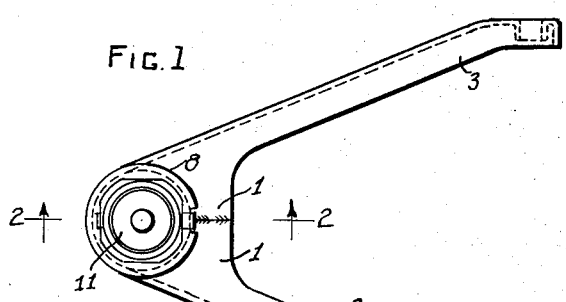
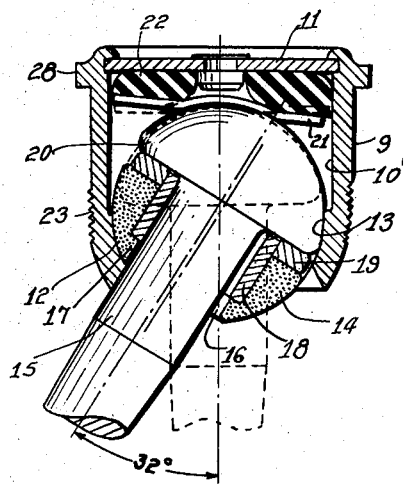
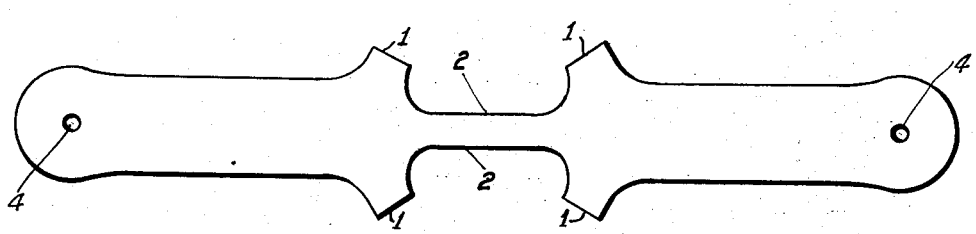
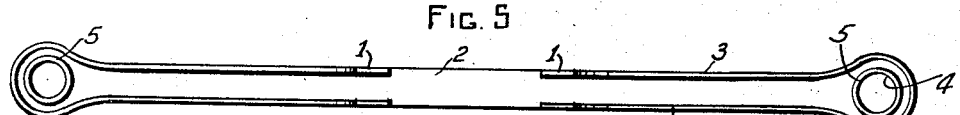
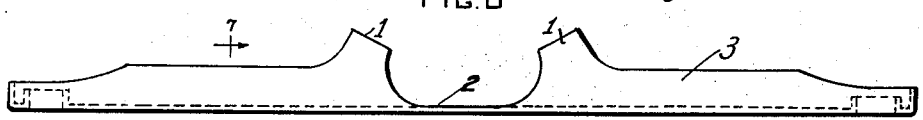
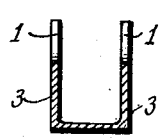
INVENTORS
MILTON A. MOSKOVITZ &
JOHN E. COLLIER
By: Ben V. Zillman
ATTORNEY

United States Patent Office 2,953,401
Patented Sept. 20, 1960

2,953,401

BALL-JOINT SUSPENSION MEANS FOR STEERABLE WHEELS

Milton A. Moskovitz, Richmond Heights, Mo., and John E. Collier, Highland Park, Mich.; said Collier assignor to Chrysler Corporation, Highland Park, Mich., a corporation of Delaware, and said Moskovitz assignor of one-fourth to Harry Frankel, St. Louis, Mo.

Filed Apr. 5, 1954, Ser. No. 420,768

7 Claims. (Cl. 287—90)

This invention relates to wheel suspension means generally, and more particularly to means for interconnecting the upper and lower pair of control arms of a motor vehicle with the front wheel most closely adjacent thereto.

A principal object of the invention is to so construct such parts to include a ball-joint at said interconnection, wherein the parts of the ball-joint will not bind or grasp during its operation, even though there may be a slight in accuracy of manufacture of the parts.

Another object of our invention is to so construct such a joint to include a tiltable and rotatable stud having a rounded head engageable with a rounded bearing surface within said cooperating socket, said stud having a shank portion projecting outwardly through said socket, with a bushing within said socket between said bearing surface and shank, providing sufficient lateral clearance between said shank and bushing to permit lateral shifting of said stud at substantially the end limit of tilting movement of the stud.

An added object of the invention is to so construct such a joint, wherein said bushing may be of a relatively weak material, and yet will not easily break, because there is interposed between said bushing and the stud a sleeve element of a relatively strong material that will take up any of the thrust or strains transmitted between the bushing and stud.

A further object of our invention is to provide a novel manner of forming said control arm of a single length of metal strip which is then deformed to acquire the desired structural strength and then bent to form an eye at one of its ends, through which a ball-joint mechanism unit may be removably inserted and attached.

Many other objects and advantages of the construction herein described will be obvious to those skilled in the art to which this invention appertains, as will be more clearly pointed out in the disclosures hereinafter set forth.

To this end, our invention consists in the novel construction, arrangement and combination of parts herein shown and described, and the manner of forming the same, all as will be readily understood and more clearly set out in the following specification.

In the drawings, wherein like reference characters represent like or corresponding parts throughout the views, Figure 1 is a plan view of one of a pair of upper and lower control arms, with a ball-joint unit detachably secured into one end thereof;

Figure 2 is a cross-sectional view of the same, taken substantially along the line 2—2 of Fig. 1, with certain of the parts broken away;

Figure 3 is a detail view in cross-section, showing the stud in both its mid-swing position and in substantially an outermost angular tilt;

Figure 4 is a plan view of the blank of metal from which the arm is fabricated;

Figure 5 is a side elevation of such blank after the flanges have been formed therealong;

Figure 6 is a top plan view of the element shown in Fig. 5; and

Figure 7 is a cross-sectional detail of said arm, taken substantially along the line 7—7 of Fig. 6.

Referring more particularly to the drawings, wherein we have illustrated a preferred embodiment of our invention, there is represented one of a pair of generally similar upper and lower control arms A, in this instance intended to be used in a connection to the front wheels of a motor vehicle.

The arm is preferably fabricated from a metal blank in the shape of an elongated strip, as shown most clearly in Fig. 4, preferably symmetrical and provided with a pair of longitudinally spaced-apart and laterally outwardly extending ears 1—1 along each of the two longitudinally extending edges of the strip, the width of the latter being reduced at the portions 2 between the ears of each pair of ears, somewhat as shown.

Next, flanges 3—3, extending lengthwise of the longitudinal edges of the strip, are formed somewhat as is indicated in Figs. 5, 6 and 7, said flanges extending inwardly from each end of the strip to the ear most closely adjacent thereto, with no flange along the portions 2. In order to permit the finished arm to be suitably connected to any adjacent structure or member, openings 4 may be formed through the outermost ends of the arm and may have an inner annular flange 5 encircling each such opening.

Next, these flanged arms are brought toward one another, as by bending, until further such movement is stopped by the pairs of ears 1—1 of each flange coming into abutting relation, as indicated in Fig. 1, and may be permanently held in such position by any suitable manner of interlock thereat, as by some suitable joint, bolting, welding, etc., so that an eye 6 is thus formed intermediate the ends of the original strip, the eye of course being at one end of the finally formed member.

If desired, a sleeve 7 may be inserted axially through the entire eye to reinforce the latter, and if desired, such sleeve may be of a material that is better suited for the purpose than that of the arm itself. The sleeve in this instance may have radially outwardly directed flanges 8 at both of its ends to form a thimble, these flanges being adapted to overlie and be superimposed on the flanges of the arm itself. Further, this sleeve may be welded in place, as indicated at 27.

A ball and socket type joint unit may be removably mounted through the eye portion of the arm, and may be replaced from time to time, if and when required, without deforming any portion of said arm or otherwise damaging the latter.

Such unit may include a shell or socket member 9 having a bore or opening 10 axially therethrough, with one end of the opening, shown as the lowermost end in this instance, being reduced in diameter. A closure element 11 may be locked across the other end of said opening in any preferred manner, somewhat as shown. At the lower or reduced end of the opening a rounded bearing surface is provided as indicated at 12, the same being rounded or concaved and preferably segmentally spherical.

A stud element comprises the other main element of the pair of relatively movable members of the ball and socket structure, with its longitudinally extending shank portion 15 projecting exteriorly through the open reduced end of the socket opening when in assembled relation within the socket. This stud is adapted to be rotatable and tiltable relatively of the socket, and in this instance has a rather wide swing or amplitude of tilt, say of approximately over 60°.

The stud is provided with a radially enlarged head that is rounded or segmentally spherical to form the convex bearing surface 13 of substantially the same curvature as that of the bearing surface 12 to cooperably engage therewith, upon angular tilt of the stud.

A bushing element 14 is interposed in the opening between the stud and bearing surface 12, being in the shape of an annulus to receive the stud shank therethrough, the convex exterior surface of said bushing being shaped to be complemental to that of the surface 12. Although this bushing may be of any material, we prefer that it be of a relatively weak material, such as of sintered metal which will efficiently retain lubricant throughout its body, and for a purpose to be hereinafter more clearly set forth this bushing is bored to loosely receive the stud shank therethrough and provide a predetermined amount of lateral clearance between itself and the shank as indicated at 16.

The bushing may be provided at its axially outermost end with a radially inwardly directed peripheral flange 17. In order to prevent the possibility that this flange may be broken, chipped, crushed or otherwise damaged under severe operating conditions, we provide reinforcing for the same, as for example the tubular or sleeve member 18 that loosely encircles the stud shank to leave lateral clearance therebetween as shown, the bore through the sleeve being such that said bore is approximately flush with that through the bushing or perhaps projecting a slight distance radially inwardly beyond the flange 17.

This sleeve member is preferably firmly attached to said bushing, as by driving or forcing it into the bushing, with the outermost end of the sleeve terminating to seat or very nearly seat on said flange 17. This sleeve member may be formed with an integral radially outwardly projecting flange or collar part 19 arranged at the upper end, or as shown, this collar portion may be a separate element and interposed between said bushing and stud head to space the same apart.

The sleeve and collar are preferably made of a material which is quite stronger than that of the bushing, to absorb the thrust or strains transmitted between the stud and bushing, so as to serve as a reinforcement for the latter, especially when the stud has been tilted to substantially the end limit of angular movement or swing, as indicated in full lines in Fig. 3 (and wherein the normal or central position of swing is indicated in dotted lines).

Although it is the desire to so manufacture the stud so that its convex surface shall be exactly complemental to that of the bearing surface 12, a deviation may occur. Where the deviation is on the plus side, so as to make the head several thousandths of an inch larger than the surface 12, the stud may then bind or grab on the surface 12, especially toward the extreme end of tilt or swing of the stud, and it is obvious that such grabbing would be highly objectionable and dangerous to proper operation of the vehicle. To this end, we have provided a construction that will compensate for such slight inaccuracies as might occur in manufacture on a production basis, and as will now be described.

As the stud is tilted toward one extreme end of swing, as illustrated in full lines in Fig. 3, and assuming that the convex surface of the head is slightly larger than that of the concave bearing surface of the socket opening, said head surface will "cam" against said socket bearing surface, to tend to actuate the stud bodily parallel to its longitudinal axis, the lateral clearance between the stud shank and the cooperating bushing, sleeve and collar readily permitting of such lateral shifting movement of the stud without damaging any of the parts. At such limit of angular tilt of the stud, the radially opposed convex portions of the head and the bushing will simultaneously ride on the complemental bearing surface of the socket opening as illustrated most clearly in Fig. 3. At such position of tilt, there may be a tendency to flex or bend the flange of the bushing and thereby cause damage to the latter, but inasmuch as this strain or thrust is transmitted through the sleeve element 18, and the collar 19, to the stud head, said flange is properly reinforced and will not easily break.

In order to more readily provide the camming surface on the stud head, a band 20 extending about the peripheral bounding portion at the base of said head, or which might be termed the corner of the latter, is radially reduced, and may be rounded if desired, to thereby most readily guide or ease the convex head surface onto the concave bearing surface of the socket.

Suitable means may be provided for resiliently or yieldably compressibly maintaining all of the joint parts in their intended bearing relation, as for example including a pressure plate 21 that is movable axially within the socket opening, with a concave portion or recess to rotatably seat the rounded head of the stud therein. It is to be noted that this element 21 is of a diameter somewhat smaller than that of the enclosing socket wall, so as to leave a lateral clearance therebetween and permit a slight lateral shifting movement of the plate as the stud is actuated toward the end limit of its tilt, as indicated in Fig. 3, the dotted lines indicating the normal or centralized position of the element 21, while its tilted position is indicated in full lines.

Any source of yieldably resilient thrust or pressure may be interposed for constantly urging said pressure plate toward said head, as for example a plug 22 of a natural or synthetic rubber or rubber-like material of such initial size and shape as to press against the enclosing wall of the socket to provide a seal therewith to prevent leakage of lubricant therepast but permitting proper axial movement of the plug axially within the socket, said plug exerting enough thrust to maintain the desired bearing relationship between the various elements of the joint unit, and yet will be sufficiently yieldable to permit tilting of the pressure plate under certain conditions, as hereinbefore set forth.

In order to quickly and readily mount said joint unit into position within the arm eye, or to remove it just as readily from the same, we provide cooperating screw thread portions 23—23 on cooperating peripheral portions of said parts, so that said unit may be inserted as a completely assembled and sealed unit, through said eye, there being a radially outwardly projecting flange 28 about the upper end of said socket element and adapted to overlie the top end of the sleeve element 7. To interlock the parts against relative rotational movement, a washer 24 may be interposed and clamped between said flange and adjacent end of the sleeve aforesaid, with one or more prongs 25 and 26, one of which may be bent in one direction to be received within a slot or opening within the adjacent flange of said sleeve, and the other prong of which may extend in the opposite direction to lie closely against and abut a flat portion of the outer peripheral bounding surface of the flange 28.

We claim:

1. A joint structure comprising a socket member having a cavity extending axially entirely therethrough and having a concave bearing surface at one end, a closure across the other end of said cavity, a rotatable and tiltable stud having its shank extending outwardly through said first end of the cavity and having a partially spherical convex head within said cavity and whose curvature is substantially complemental to that of said concave bearing surface and slidably engages the latter after a predetermined tilt of said stud and having a substantially planar under face, a bushing rotatable and tiltable within said cavity and seating on said bearing surface and is axially bored for receiving and encircling said shank and having a convex exterior surface movably engaging said concave bearing surface and having a substantially planar end face opposed to said planar under face of said head and also having a radially inwardly directed flange at said first-mentioned end of said cavity, a sleeve extending axially between said stud and bushing and of such length that said bushing extends axially outwardly beyond said first-mentioned end of said socket member and beyond said sleeve, said sleeve transmitting thrust between said stud and bushing and reinforcing the latter, and yieldably compressible means between said head and closure to maintain the parts in proper bearing relation.

2. A joint structure comprising a socket member having a cavity extending axially entirely therethrough with a concave bearing surface at one end, a closure element across the other end of said cavity, a rotatable and tiltable stud having a fragmentally spherical head within said cavity and of a size substantially complementally engaging said bearing surface and a shank projecting outwardly through said first-mentioned end of said cavity, a bushing rotatable and tiltable in said socket member and centrally bored to receive said shank therethrough and having a convex exterior surface engaging said concave bearing surface and is provided with a radially inwardly directed flange adjacent said first-mentioned end of said socket member, an axially extending sleeve of greater compression strength than said bushing and interposed between said stud and bushing and having its axially outermost end substantially abutting said flange, said sleeve having a collar projecting radially therefrom and spacing said head and bushing apart and whereby said stud and collar have relative axial movement therebetween, and yieldably compressible means between said closure and head and constantly urging the parts toward their proper bearing relation.

3. A joint structure of the kind described comprising a socket member having a cavity axially entirely therethrough with a concave bearing surface at one end, a closure across the other end of said cavity, a rotatable and tiltable stud extending through said cavity and having a convex head in the latter, a bushing rotatable and tiltable in said cavity and axially bored to receive and encircle said shank and provided with a convex bearing surface and with a radially inwardly directed flange at the axially outermost end, a sleeve between said stud and bushing and having an axially outermost end terminating closely adjacent said flange, the diameter of said head being so proportioned that its convex surface and said bushing simultaneously engage said concave bearing surface at substantially the tilt limit of said stud, pressure transmitting means between said closure element and head recessed to receive the latter and spaced laterally from the peripheral bonding surface of said cavity and tiltably actuated through said stud, and yieldably compressible means between said closure element and pressure transmitting means.

4. A joint structure comprising a socket member having a cavity axially entirely therethrough with a concave bearing surface at one end, a closure across the other end of said cavity, a rotatable stud tiltable in all planes in said cavity and having its shank extending outwardly through said end of the cavity, said stud having a radially enlarged spherically segmental rounded head within said cavity, the radius of curavture of said rounded surface of said head being complemental to that of said concave bearing surface, and there being a substantially planar face at the under side of said head, a bushing rotatable and tiltable in said cavity and loosely receiving said stud shank therethrough and having a convex exterior surface engaging said concave bearing surface permitting lateral shifting of said stud relatively of said bushing, said head engaging said concave bearing surface after predetermined stud tilt in any plane, and resiliently compressible means between said closure and head urging said stud outwardly through said cavity.

5. A joint structure substantially as described in claim 4 but further characterized in that there is a sleeve loosely encircling said shank and interposed between said stud and bushing and reinforcing the latter in transmitting thrust therebetween.

6. A device substantially as described in claim 4, but further characterized in that the bounding corner of said head between its rounded surface and planar under face is radially reduced in diameter forming a cam surface engaging said concave bearing surface and actuating said stud bodily substantially parallel to its longitudinal axis.

7. A joint structure comprising a socket member having a cavity axially entirely therethrough with a concave bearing surface at one end, a closure across the other end of said cavity, a rotatable and tiltable stud having its shank extending outwardly through said first-mentioned end of the cavity and having a rounded head within the latter engaging said bearing surface, a bushing rotatable and tiltable within said cavity and having a bore loosely receiving said shank and with a convex exterior seating on said concave bearing surface and projecting axially beyond the adjacent end of said socket member, a pressure transmitting member in said cavity and engaging the rounded surface of said head and provided with a peripheral surface that is spaced from the peripheral bounding wall of said cavity, and a yieldably compressible means between said closure and the pressure transmitting member and urging the latter toward said head, whereby when the head and bushing simultaneously engage said bearing surface at substantially the end limit of tilt of the stud the latter may shift bodily laterally to its longitudinal axis and said pressure transmitting member is similarly shifted laterally through said stud shift.

References Cited in the file of this patent

UNITED STATES PATENTS

| | | |
|---|---|---|
| 458,319 | Merriam | Aug. 25, 1891 |
| 1,443,518 | Anderson | Jan. 30, 1923 |
| 1,914,997 | La Brie | Jan. 20, 1933 |
| 2,071,341 | Hufferd et al. | Feb. 23, 1937 |
| 2,139,294 | Weigant | Dec. 6, 1938 |
| 2,147,815 | Hufferd et al. | Feb. 21, 1939 |
| 2,364,176 | Waldron | Dec. 5, 1944 |
| 2,451,062 | Booth | Oct. 12, 1948 |
| 2,593,253 | Booth | Apr. 15, 1952 |

FOREIGN PATENTS

| | | |
|---|---|---|
| 670,470 | Great Britain | Apr. 16, 1952 |
| 1,006,980 | France | Jan. 30, 1952 |